Aug. 30, 1932.   C. ANDREWS   1,874,412
FOOD PRESS
Filed Nov. 7, 1931
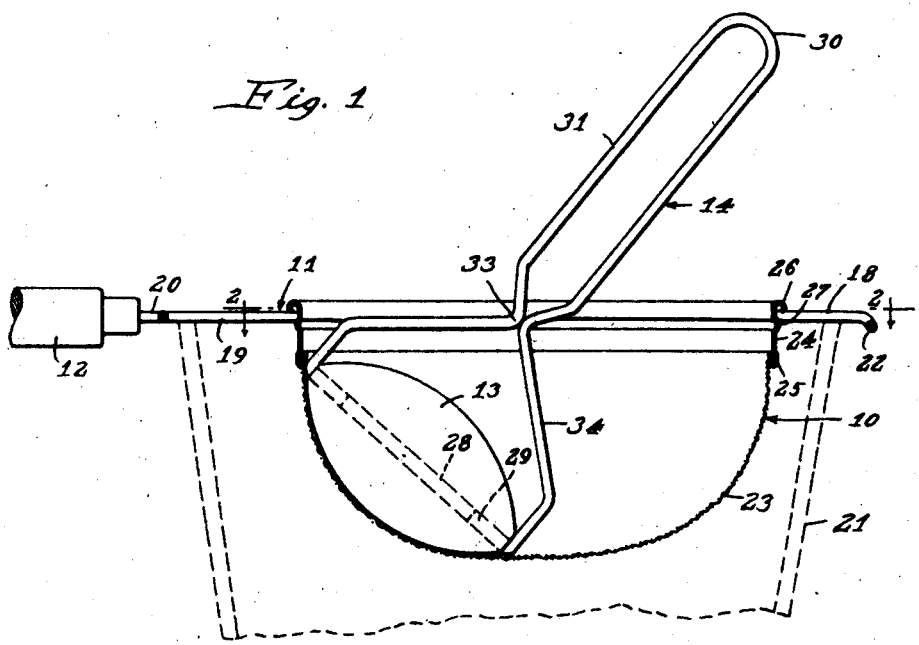
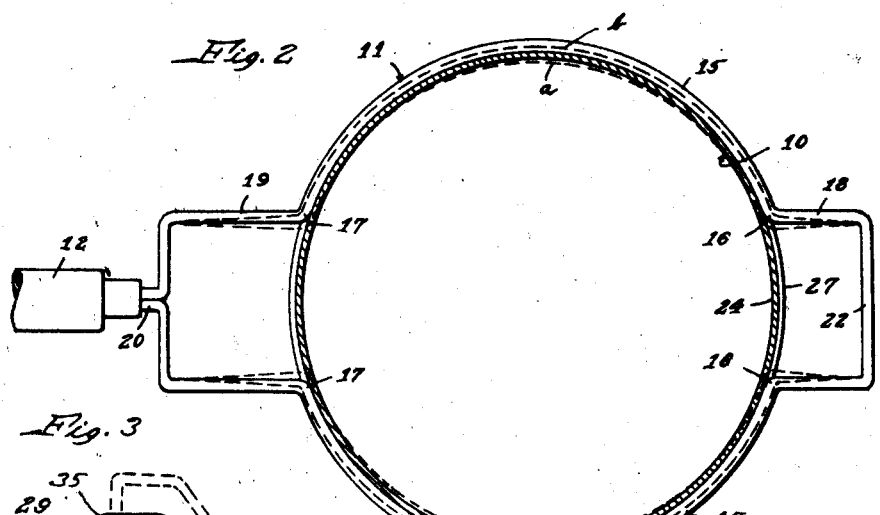
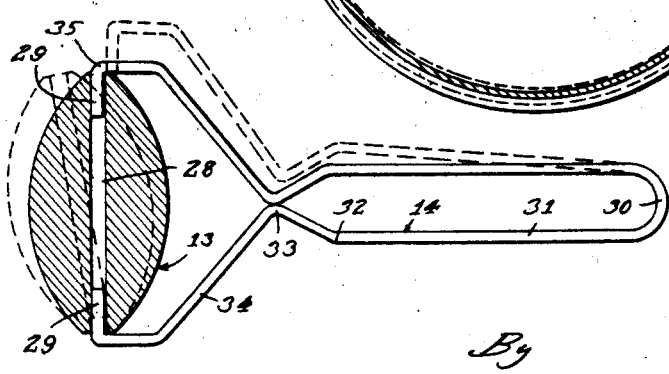
Inventor:
Charles Andrews
By
Wilson, Dowell, McKenna & Rehm
Attys.

Patented Aug. 30, 1932

1,874,412

UNITED STATES PATENT OFFICE

CHARLES ANDREWS, OF ROCKFORD, ILLINOIS, ASSIGNOR TO THE WASHBURN COMPANY, OF WORCESTER, MASSACHUSETTS, A CORPORATION OF MASSACHUSETTS

FOOD PRESS

Application filed November 7, 1931. Serial No. 573,559½.

This invention relates to kitchen utensils, and has particular reference to a food press and ricer for use with vegetables, fruits and the like.

The principal object of my invention is to provide a food press having in combination a suitably supported screen bowl of substantially semi-spherical or concave-convex form and a roller of elongated substantially ellipsoidal form, round in cross-section from end to end thereof and conformed peripherally to fit the concave inside curvature of the bowl in any position of the roller therein, whereby to roll in the bowl on the natural arc thereof for efficient operation upon food placed in the bowl to be pressed through the screen thereof.

Another object of my invention is to provide a holder for the roller which, while quickly detachable from the roller for purposes of cleaning, holds the roller securely for easy and convenient manipulation thereof in the bowl.

This application is a division of my co-pending application, Serial No. 474,231, filed August 9, 1930.

The invention is illustrated in the accompanying drawing, in which—

Figure 1 is a longitudinal vertical section through the utensil of my invention, indicating in dotted lines how the same is adapted to rest on the rim of a bowl or other dish during use;

Fig. 2 is a horizontal section on the line 2—2 of Figure 1 showing the frame in plan, the latter also having its normal and its spread condition indicated in dotted lines, and Fig. 3 is a view of the roller and holder, the same being shown also in dotted line positions, indicating the method of assembling and disassembling.

The same reference numerals are applied to corresponding parts throughout the views.

The press comprises a screen bowl or hopper 10 mounted in a frame 11 provided with a handle 12. The roller and its holder are numbered 13 and 14, respectively, and will be described presently.

Proceeding now with the description of the utensil, the frame 11 is made from a single piece of wire bent so as to form complemental arcuate portions 15, which together approximate a circle for reception of the bowl 10, but are bent outwardly at two laterally spaced points 16 at one side of the circle and at two other laterally spaced points 17 at the diametrically opposite side so as to form substantially U-shaped projecting toe and heel portions 18 and 19, respectively. The free ends of the wire project from the heel portion 19 into the handle 12, as indicated at 20. It will be observed that the ends are entered into the handle far enough to bring the ferrule on the handle into such close proximity with the heel portion 19 as to prevent displacement of said ferrule from said handle. In many utensils, where no such precaution is taken, the ferrule works loose and it is quite an annoyance to have to replace it on the handle practically every time the utensil is used. The toe and heel portions are adapted to support the utensil on the rim of a suitable dish or other receptacle 21. The said toe and heel portions are of sufficient length so that the utensil will fit a reasonably large range of sizes of dishes. The front end of the toe portion 18 is bent downwardly, as indicated at 22 in Figure 1, for abutment with the outside of the rim to keep the utensil from dropping down in the dish at that end, and the handle 12 constitutes a sufficient projection at the rear end of the heel portion 19 to serve by abutment with the outside of the rim of the dish to keep that end of the utensil in place. The screen bowl 10 comprises a screen 23 held in a circular sheet metal frame 24 by the crimping of the lower edge 25 thereon in the usual manner. The upper edge of the sheet metal frame 24 is rolled so as to provide an outwardly projecting rim 26, and slightly below this rim an annular, outwardly projecting bead 27 is provided. The wire frame 11 is arranged to have the arcuate portions 15 thereof fit on the frame 24 between the rim 26 and bead 27. In order, however, that the frame 11 will hug the frame 24, the portions 15, which, of course, aggregate less than 360°, normally occupy a position within concentricity, as indicated in dotted lines at *a* in Fig. 2. Then, as the frame 11 is forced over the bead 27, as the resilience of the toe and heel portions 18 and 19 permits, the portions 15 are spread to a position beyond concentricity, as indicated in dotted lines at *b* in Fig. 2. Hence after, the portions 15 have passed over the bead 27, and contract so as to fit between the bead and the rim 26, and are disposed substantially concentric with one another and with the frame 24, the portions 15, by reason of the inherent resilience of the frame, grip the frame 24 tightly enough to keep the bowl from turning around or coming out. The bowl may, however, be removed quickly and easily when desired, either for the purpose of cleaning the utensil, or when a bowl having a different mesh screen is to be used. Thus, a bowl having a screen of a mesh suitable for ricing potatoes would not be suitable for straining grape juice or for some other purpose, and, for that reason, it is contemplated to sell the utensil with a suitable number of screen bowls of different meshes to meet any requirements. The bowls will, of course, have the same sized sheet metal frame 24, formed in the manner above described, so that each bowl will fit in the wire frame 11, as described.

Referring now more particularly to Figs. 1 and 3 for an understanding of the novel features of the roller 13 and holder 14, it will be seen that the roller 13 is of elongated substantially ellipsoidal form, round in cross-section from end to end thereof and conformed peripherally so as to fit the concave inside curvature of the bowl 10 in any position of the roller therein, whereby to roll in the bowl on the natural arc thereof, as indicated in Figure 1, and press the food being operated upon through the screen. The roller has an axial hole 28 drilled through it for reception of the trunnions 29 of the holder 14 on which the roller is mounted for rotation. The holder 14 is formed from a single piece of heavy wire bent intermediate the ends thereof, as at 30, to form a narrow elongated U-shaped handle 31. The sides of the U are bent inwardly toward each other, as at 32, at the front end of the handle 31 to provide abutting portions 33, and are then bent outwardly in diverging relation to one another to provide the yoke portion 34. The free ends of the wire are bent inwardly toward one another, as at 35, to provide the trunnions 29 on the yoke. The wire of the holder 14 has sufficient resilience to permit spreading thereof from the full line position shown in Fig. 3 to the dotted line position, whereby to disengage the one trunnion 29 from the hole 28 for removal of the roller 13 from the holder. By reason of the special forming of the holder, it is obvious that a spread of the yoke 34 sufficient to disengage or reengage one of the trunnions 29 does not call for much flexing at the bend 30, due to the remoteness of the bend with reference to the trunnions. Hence, since the wire holder does not have to be spread anywhere near the elastic limit, the roller can be removed and replaced as often as necessary and the holder will always stay the same and give the same satisfactory service. The facility with which the roller can be removed and replaced is, of course, a great advantage since it permits thoroughly cleaning the parts. The fact that the sides of the handle 31 are bent into abutment at 33 prevents contraction of the yoke 34, and the roller 13 is, therefore always free for easy operation. In other words, it makes no difference how tightly one grips the handle 31. The abutment at 33 also prevents needless flexing of the wire at 30 in the gripping of the handle, which might otherwise in the course of time result in fatigue at the bend and possibly breakage.

The operation of the press should be clear from the foregoing description. Attention is, however, called to the fact that the combination of the elongated substantially ellipsoidal roller round in cross-section from end to end and conformed to fit the concave inside curvature of the bowl in any position of the roller therein so as to roll in the bowl on the natural arc thereof, gives line contact of the roller in the bowl substantially the full length of the roller in any position thereof and makes for most efficient operation upon the food placed in the bowl to be pressed through the screen thereof. It has also been found that this type of press can be used with much less fatigue because of the ease with which the roller is moved in the bowl. In other words, it has rolling contact as distinguished from sliding contact and the resistance to movement is proportionately decreased. The rolling operation has also been found more efficient in extracting food than the simple pressing operation of other devices like potato mashers.

I claim:

1. A food press roller of elongated substantially ellipsoidal form, round in cross-section from end to end thereof and conformed peripherally so as to fit the inside curvature of a substantially semi-spherical food press bowl in any position of the roller therein, whereby to roll in the bowl on the natural arc thereof.

2. A food press roller of elongated substantially ellipsoidal form, round in cross-section from end to end thereof and conformed peripherally so as to fit the inside curvature of a substantially semi-spherical food press bowl in any position of the roller therein, whereby to roll in the bowl on the natural arc thereof, and a holder for the roller for manipulating the same in a bowl.

3. A food press roller of elongated substantially ellipsoidal form, round in cross-section from end to end thereof and conformed peripherally so as to fit the inside curvature of a substantially semi-spherical food press bowl in any position of the roller therein, whereby to roll in the bowl on the natural arc thereof, said roller having an axial hole provided therein, and a holder for the roller fitting in said hole whereby to permit rolling of the roller in a bowl by manipulation of the holder.

4. A food press roller of elongated substantially ellipsoidal form, round in cross-section from end to end thereof and conformed peripherally so as to fit the inside curvature of a substantially semi-spherical food press bowl in any position of the roller therein, whereby to roll in the bowl on the natural arc thereof, said roller having an axial hole provided therein, and a holder for the roller fitting in said hole whereby to permit rolling of the roller in a bowl by manipulation of the holder, the holder being detachably received in said hole to permit removal and replacement of the roller from the holder to facilitate cleaning or permit substitution of a new roller.

5. The combination in a food press, of a screen bowl of substantially semi-spherical form adapted to receive a quantity of food to be pressed through the screen body thereof, the said screen body of the bowl being permanently mounted in a circular sheet metal frame forming the supporting rim thereof, a roller of elongated, substantially ellipsoidal form having an axial hole therein, said roller being round in cross-section and conformed peripherally, from end to end of its axial hole, to fit the semi-spherical inside curvature of the bowl whereby to roll therein on the natural arc thereof, and a holder for the roller fitting in its axial hole and arranged to roll the same in the bowl to press the food through the screen thereof.

6. The combination in a food press, of a screen bowl of substantially semi-spherical form adapted to receive a quantity of food to be pressed through the screen body thereof, the said screen body of the bowl being permanently mounted in a circular sheet metal frame forming the supporting rim thereof, a roller of approximately ellipsoidal form having an axial hole provided therein, the said roller being elongated to approximately the radius of the bowl and conformed peripherally, from end to end of the axial hole, to the arc described by the semi-spherical inside of the bowl at all points thereof, and being round in cross-section, whereby to roll on the inside of the bowl on the natural arc thereof in any position of the roller with respect to the bowl, and a holder for said roller rotatably received in the axial hole thereof arranged to roll the roller in the bowl to press the food through the screen thereof.

7. A utensil of the character described comprising, in combination, a screen bowl of substantially semi-spherical form adapted to receive a quantiy of food to be pressed through the screen thereof, a roller of elongated substantially ellipsoidal form, round in cross-section from end to end thereof and conformed peripherally so as to fit the semi-spherical inside curvature of the bowl in any position of the roller therein, whereby to roll in the bowl on the natural arc thereof, and a holder for the roller arranged to roll the same in the bowl to press the food through the screen thereof.

8. A utensil of the character described comprising, in combination, a substantially concavo-convex bowl of foraminate material adapted to receive a quantity of food, a roller of elongated form round in transverse cross-section from end to end and of double convex form in longitudinal cross-section to substantially fit the concave inside curvature of the bowl in any position of the roller therein whereby to roll in the bowl on the natural arc thereof, and a holder for manipulating the roller in the bowl to press the food through the openings in the foraminate material thereof.

9. A food press roller of elongated form round in transverse cross-section from end to end and of double convex form in longitudinal cross-section to fit the concave inside curvature of a substantially concavo-convex bowl in any position of the roller therein, whereby to roll in the bowl on the natural arc thereof.

10. A food press roller of elongated form round in transverse cross-section from end to end and of double convex form in longitudinal cross-section to fit the concave inside curvature of a substantially concavo-convex bowl in any position of the roller therein, whereby to roll in the bowl on the natural arc thereof, and a holder supporting the roller at its opposite ends for rotation about the axis thereof for manipulation of the roller in the bowl.

In witness of the foregoing I affix my signature.

CHARLES ANDREWS.